(12) United States Patent
Sood

(10) Patent No.: US 7,961,684 B2
(45) Date of Patent: Jun. 14, 2011

(54) FAST TRANSITIONING RESOURCE NEGOTIATION

(75) Inventor: Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 973 days.

(21) Appl. No.: 11/777,673

(22) Filed: Jul. 13, 2007

(65) Prior Publication Data

US 2009/0016247 A1    Jan. 15, 2009

(51) Int. Cl.
*H04W 4/00* (2009.01)
*H04B 7/00* (2006.01)

(52) U.S. Cl. ........ 370/331; 370/310; 370/328; 370/329; 370/332; 370/338; 370/341

(58) Field of Classification Search .................. 455/41.2, 455/410–411, 418, 422.1, 432.1–432.3, 434, 455/435.1–435.2, 436–444, 447–451, 452.1–452.2, 455/453, 455, 550.1, 556.2, 561, 67.11, 500, 455/503, 517, 524–525; 370/328–329, 331–332, 370/338, 341, 310, 334, 395.2–395.21, 395.52, 370/437, 911–913, 915; 713/168, 171; 380/30, 380/45, 270, 272, 247

See application file for complete search history.

(56) References Cited

U.S. PATENT DOCUMENTS

| | | | |
|---|---|---|---|
| 5,950,124 A * | 9/1999 | Trompower et al. ........ | 455/422.1 |
| 7,593,731 B2 * | 9/2009 | Lim et al. ...................... | 455/436 |
| 2004/0082311 A1 * | 4/2004 | Shiu et al. ...................... | 455/403 |
| 2004/0236939 A1 | 11/2004 | Watanabe et al. | |
| 2004/0240412 A1 * | 12/2004 | Winget .......................... | 370/331 |
| 2004/0242228 A1 | 12/2004 | Lee et al. | |
| 2005/0136929 A1 * | 6/2005 | Iacono et al. .................. | 455/436 |
| 2005/0278532 A1 * | 12/2005 | Fu et al. ......................... | 713/169 |
| 2006/0013398 A1 * | 1/2006 | Halasz et al. .................. | 380/273 |
| 2006/0067526 A1 * | 3/2006 | Faccin et al. ..................... | 380/46 |
| 2006/0079241 A1 | 4/2006 | Faccin et al. | |
| 2006/0083200 A1 * | 4/2006 | Emeott et al. ................. | 370/331 |
| 2006/0083201 A1 | 4/2006 | He et al. | |
| 2007/0258384 A1 * | 11/2007 | Sammour et al. ............. | 370/252 |
| 2008/0068991 A1 * | 3/2008 | Ponauswamy ................ | 370/230 |
| 2008/0072047 A1 * | 3/2008 | Sarikaya et al. .............. | 713/171 |

OTHER PUBLICATIONS

Sood, Kapil, U.S. Appl. No. 11/462,657, filed Aug. 4, 2006.
Sood, Kapil, U.S. Appl. No. 11/613,094, filed Dec. 19, 2006.
P802.11rTM/D4.0, Draft Amendment to Standard for Information Technology—Telecommunications and Information Exchange Between Systems—Local and Metropolitan Area Networks—Specific Requirements—Part 11: Wireless LAN Medium Access Control (MAC) and Physical Layer (PHY) specifications: Amendment 2: Fast BSS Transition, IEEE 802 Committee of the IEEE Computer Society, Nov. 2006, 116 pgs.

* cited by examiner

*Primary Examiner* — Meless N Zewdu
(74) *Attorney, Agent, or Firm* — John F. Travis

(57) ABSTRACT

Embodiments of apparatuses, articles, methods, and systems for fast transitioning resource negotiation in wireless networks are generally described herein. Other embodiments may be described and claimed.

17 Claims, 5 Drawing Sheets

FAST TRANSITIONING RESOURCE NEGOTIATION

FIELD

Embodiments of the present invention relate generally to the field of wireless networks, and more particularly to fast transitioning resource negotiation in said wireless networks.

BACKGROUND

A communication session in a wireless network typically involves a local station communicating with a remote station via a communication link. The communication link may include a wireless connection between the local station and an access point. For various reasons, the quality of the wireless connection between the access point and the local station may deteriorate. This may be due to overloading of the access point, mobility of the station, interference, etc. In order to preserve the established communication link, the local station may reassociate the wireless connection with another access point. When the communication session involves delay intolerant transmissions, e.g., voice or video, various quality of resource (QoS) challenges are presented for a successful and efficient reassociation of the wireless connection.

Contemplated techniques for providing fast transitioning (FT) involve an authentication procedure between a station and one or more access points. The authentication procedure may allow the station to determine which access points in the area are candidates for reassociation. This may include derivation of shared keys between the station and the reassociation candidates. Once this authentication has been established, the station may choose an access point to reassociate the wireless connection and commence with a resource negotiation.

The resource negotiation may take place through a number of integrity checked messages (through use of the shared keys) exchanged between the access point and the station. The resource negotiation may either take place prior to, or simultaneously with, a reassociation procedure. The station may request, through the resource negotiation, sufficient resources to be allocated to the station so that QoS levels of the wireless connection are maintained. If the access point has the resources to allocate it will do so and the reassociation procedure may progress. If the resource negotiation fails, the station may not be able to reassociate with the access point and may need to restart the procedure with another access point. This delay may compromise the station's ability to provide a high-QoS level wireless connection.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Embodiments of the present invention may provide a method, article of manufacture, apparatus, and system for fast transitioning resource negotiation in wireless networks.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language that may be used in connection with various embodiments, the phrase "A/B" means (A) or (B); the phrase "A and/or B" means (A), (B), or (A and B); and the phrase "A, B, and/or C" means (A), (B), (C), (A and B), (A and C), (B and C) or (A, B and C).

As used herein, reference to a "component" may refer to a hardware, a software, and/or a firmware component employed to obtain a desired outcome. Although only a given number of discrete components may be illustrated and/or described, such components may nonetheless be represented by additional components or fewer components without departing from the spirit and scope of embodiments of the invention.

Figure 1:
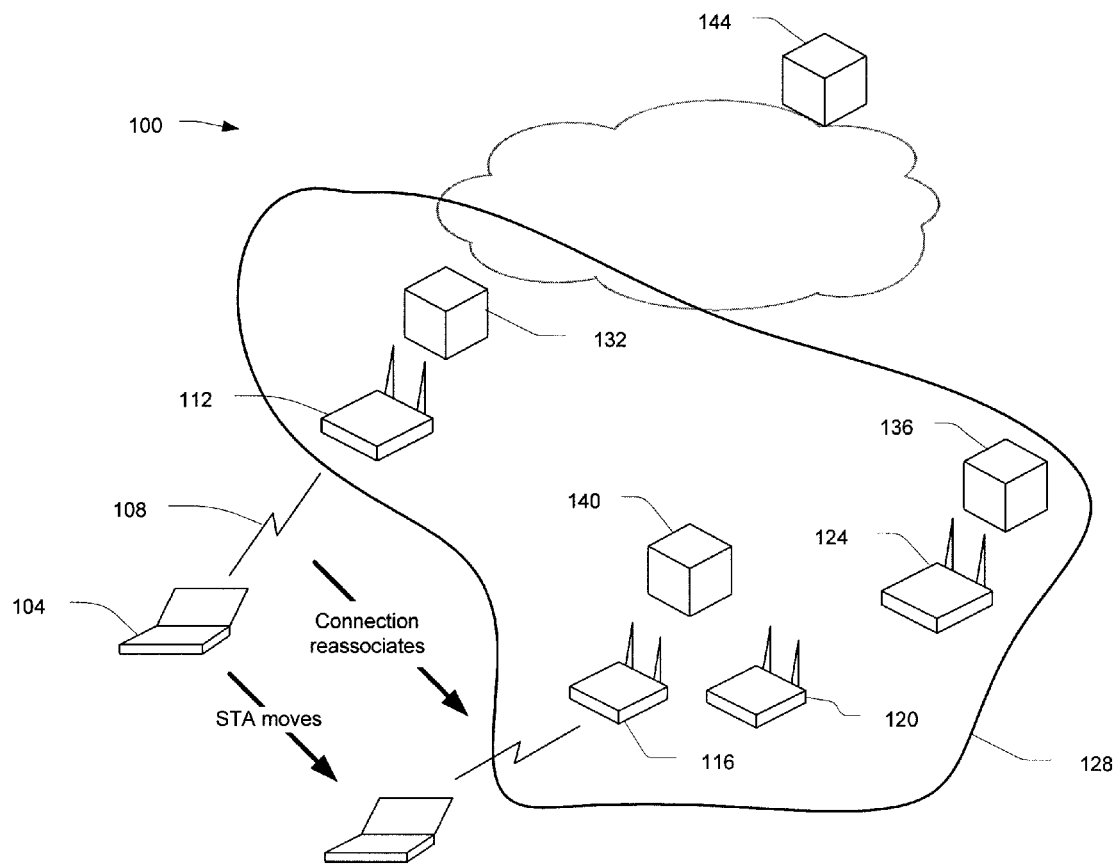
FIG. 1 illustrates a network providing for fast transitioning in accordance with various embodiments of this invention.

FIG. 1 illustrates a network 100 supporting fast transitioning (FT) of mobile wireless devices utilizing FT resource negotiation in accordance with an embodiment of this invention. In particular, the FT resource negotiation of various embodiments may include a supported resource type determination within an authentication exchange of the various network entities. Performing this resource type determination contemporaneously with authentication may allow an entity to identify reassociation targets from a number of possibilities early in an FT operation. Security mechanisms to address issues that may stem from such a determination being conducted prior to a conclusion of an authentication process may also be described in accordance with various embodiments.

Briefly, the network 100, which may be a wireless local area network (WLAN), a wireless metropolitan area network (WMAN), etc., may include a wireless network node, e.g., station 104, having a wireless connection 108 with another wireless network node, e.g., access point (AP) 112. The network 100 may also include other wireless network nodes, e.g., APs 116, 120, and 124. The APs may be part of a mobility domain (MD) 128 operated by an infrastructure provider. The provider may define the MD 128 as an administrative function.

The wireless connection 108 may be initially associated with the AP 112 at the beginning of a communication session. The communication session may be secured through a number of key holders distributed throughout the MD 128. Each AP may be associated with a key holder (KH). For example, AP 112 may be associated with KH 132; both APs 116 and 120 may be associated with KH 140; and AP 124 may be associated with KH 136. As can be seen, a KH may be uniquely associated with an AP (and may sometimes be implemented in the same device) or a KH may be associated with more than one AP.

Upon initial association of the wireless connection 108, the station 104 and an authentication server 144 may mutually authenticate each other using, e.g., an extensible authentication protocol (EAP). Upon mutual authentication, the authentication server 144 may deliver a master secret key (MSK) to the AP 112 and the station 104.

The KH associated with the AP 112, e.g., KH 132, may use the MSK to compute a first level pairwise master key (PMK)-R0. In this context, the KH 132 may also be referred to as the R0KH 132.

At this time, the station 104 and the authentication server 144 may also agree on security ciphers, e.g., encryption ciphers, authentication ciphers, and/or key-wrap ciphers, that will be used for providing encryption and authentication functions in the communication session. These security ciphers will be used for securing communication between the station 104 and the APs of the MD 128 as the station 104 moves among the APs using FT.

The R0KH 132 may use the PMK-RO and an identity of an R1KH, which may be the R0KH 132 for the initial association, to generate a second level pairwise master key, e.g., PMK-R1 key. The PMK-R1 key may then be used in deriving a pairwise transient key (PTK) session key.

The station 104 may use the MSK to derive the PMK-R0, PMK-R1, and PTK keys in a similar manner as the R0KH 132. The keys derived by the station 104 may match those derived by the R0KH 132 as both use the same ingredients in the same key derivation function. With the keys properly derived, the station 104 may have a secure association with the AP 112 through the wireless connection 108.

If the station 104 observes deterioration in the quality of the wireless connection 108, the station 104 may initiate FT operations in order to reassociate the wireless connection 108 with another AP that is capable of providing appropriate quality of service (QoS) levels given the nature of the communication session. In various embodiments, the communication session may include delay and/or jitter sensitive network traffic such as, but not limited to, streaming multimedia, Internet protocol (IP) telephony (e.g., voice-over IP (VoIP)), video teleconferencing, etc. Accordingly, it may be desirable for an FT operation to occur in a manner such that a detectable disruption to the established communication session may be avoided.

As used herein, "fast transitioning," which may also be referred to as "fast roaming," may be compatible with the fast transition operations described in one or more of the Institute of Electrical and Electronics Engineers (IEEE) wireless standards, e.g., the 802.11-2007 standards along with any revisions, amendments or updates thereto including, but not limited to, 802.11r amendments regarding fast basic service set transitions.

While the above embodiment discusses an initial association of a wireless connection between a station and an access point and a reassociation of the wireless connection to another access point, other embodiments may include associations among other combinations of wireless network nodes. For example, the association of a wireless connection may be between an AP and another AP, a station and another station, etc. As used herein an "association" may include both an initial association and a reassociation.

Wireless network nodes may be any type of device capable of performing associations involved in the FT operations described herein. In some embodiments network nodes may be mobile network client devices such as, but not limited to, a personal computing device, a laptop computing device, a phone, etc., or network infrastructure devices, e.g., a server, an access point, etc.

Figure 2:
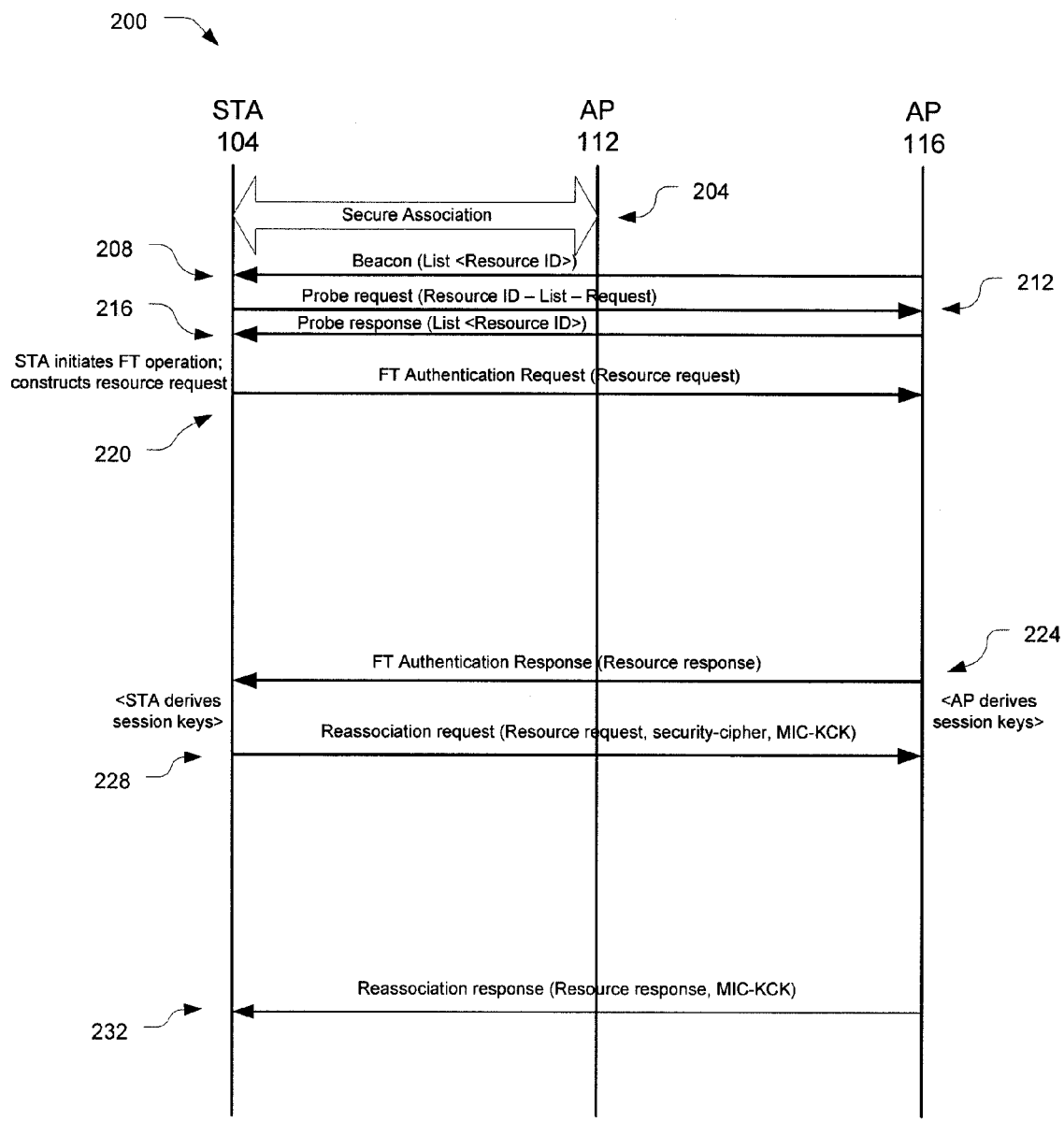
FIG. 2 illustrates message sequences of a fast transitioning operation in accordance with various embodiments of this invention.

FIG. 2 illustrates message sequences 200 that include an FT operation in accordance with various embodiments of the present invention. The FT operation may follow a secure association 204 between the station 104 and the AP 112, which may be established as described above.

Prior to initiating the FT operation, the station 104 may discover preliminary FT information, which may include resource identifiers in some embodiments, of other neighboring APs to determine if an FT operation is possible. In some embodiments, the APs of the MD 128 may transmit management frames to provide stations with this preliminary FT information. These management frames may be transmitted in a beacon message 208 that is periodically broadcast (e.g., once every 100 milliseconds) by an AP, e.g., AP 116. In another embodiment, a station 104 may transmit a probe request 212 to the AP 116, which may respond with the preliminary FT information in a probe response 216. In yet another embodiment, this information may be delivered using AP-neighbor reports. For example, the AP 112 may collect this information from its neighbor APs and deliver the information to the station 104 in management frames, which may be transmitted as management action frames.

In some embodiments, APs may decide not to advertise resource identifiers in beacons to reduce beacon bloat.

If an FT operation is possible with one or more of the APs, the station 104 may identify those APs as reassociation candidates and initiate reassociation procedures with one or more of the reassociation candidates when desired.

The station 104 may initiate an FT operation by constructing a resource negotiation request and transmitting it to the AP 116 in an FT authentication request 220.

Figure 3:
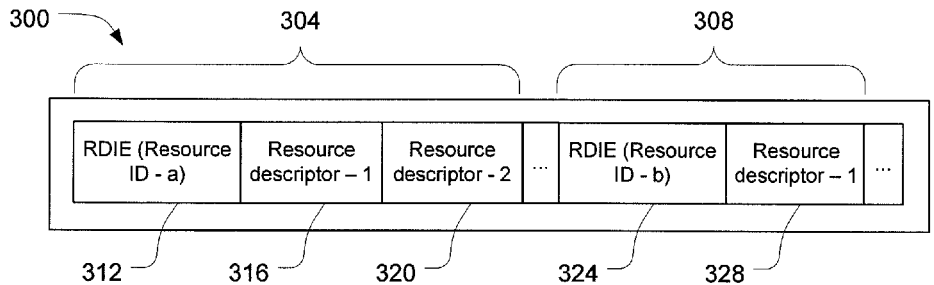
FIG. 3 illustrates a data structure of a resource negotiation request in accordance with various embodiments of this invention.

FIG. 3 illustrates a data structure of a resource negotiation request 300 that may be transmitted in the FT authentication request 220 in accordance with an embodiment of the present invention. The resource negotiation request 300 (hereinafter "resource request 300"), which may also be referred to as a resource information container (RIC), may include a first data stream resource request, e.g., stream 304, and a second data stream resource request, e.g., stream 308. The different streams may indicate a different type of network traffic. For example, stream 304 may be for video, while stream 308 may be for voice.

The stream 304 may include a RIC data information element (RDIE) 312 that identifies the stream 304, e.g., resource ID—a, followed by a number of QoS resources, e.g., resource descriptor—1 316, resource descriptor—2 320. The QoS resources may be resource alternatives listed in the order of preference. That is, resource descriptor—1 316 is the first choice of station 104, resource descriptor—2 320 is the second, and so forth.

The QoS resources may include a traffic specification information element (TSPEC IE) to describe the traffic pattern for which service is being requested including, e.g., data rate, packet size, delay, and service interval; a traffic classification (TCLAS) IE to specify certain parameters to identify a packet as belonging to the communication session; and a TCLAS processing IE to provide information on processing of packets. These information elements may be similar to like-name elements described in IEEE 802.11(e) (published Nov. 11, 2005), along with any updates, revisions, and/or amendments to such.

The stream 308 may have RDIE 324 followed by only one resource descriptor—1 328. Accordingly, no alternatives QoS resources are listed for stream 308.

Figure 4:
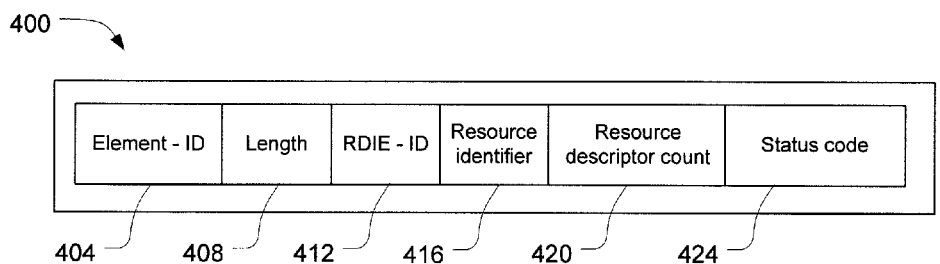
FIG. 4 illustrates a data structure of a resource information container data information element in accordance with various embodiments of this invention.

FIG. 4 illustrates a data structure of an RDIE 400 that may be included in the resource negotiation request 300 in accordance with various embodiments of the present invention. The RDIE 312 and/or 324 may have a structure similar to the RDIE 400.

The RDIE 400 may include an element ID 404, which identifies the RDIE 400 as a particular type of information element, and a length 408 indicating the size of the remaining RDIE 400.

The RDIE 400 may also have a unique identifier RDIE—ID 412 followed by a resource identifier 416. The resource identifier 416, which may be similar to resource identifiers transmitted in preliminary FT information, may uniquely identify a type of resource that may be requested in the stream associated with the RDIE 400. The resource identifier 416 may be an identifying field that can be cross-referenced to a resource definition by a network entity, e.g., AP 116, when it receives the RDIE 400. This may prevent the AP 116 from having to process the requested QoS resources (including any necessary error resolution and/or correction procedures) and attempt to match them with its possible supported resources in order to determine if the resource type is supported or not, which could add unnecessary latencies into an FT operation.

Communicating the resource identifier in the resource request 300 may allow a station to determine whether an AP has a particular resource type, which may be useful in situations where the AP has been identified as an FT candidate without the station having received this information in the preliminary FT information (e.g. because the AP did not broadcast it to reduce beacon bloat, etc.)

Figure 5:
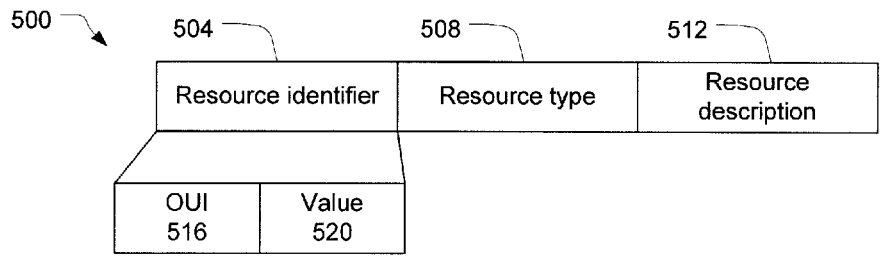
FIG. 5 illustrates a resource definition in accordance with various embodiments of this invention.

FIG. 5 illustrates a resource definition 500 that may define the types of resources that may be supported by a particular AP in accordance with various embodiments of the present invention. The resource definition 500 may include a resource identifier 504 followed by a resource type 508 and a resource description 512. The resource identifier 504 may be any identifier used to uniquely identify the resource type 508. In one embodiment, it may include an organizationally unique identifier (OUI) 516 and a value 520. The OUI 516 may be a number that is assigned by a registration authority, e.g., IEEE, which uniquely identifies a vendor, manufacturer, or other organization. An organization, e.g., 802.11e, WiFi Alliance, etc., may define their own specific resource types that may be carried in a resource request. The value 520 may be another number, which, in combination with the OUI 516, may allow a particular organization to define more than one resource type.

In various embodiments the resource type 508 may refer to a variety of resource types, e.g., resources based on voice/video/control QoS, media access control (MAC) block acknowledgements, network access to backend services, location-based services, new video MAC enhancements, etc. In various embodiments, the resource type 508 may be an 802.11e-based resource (e.g., hybrid coordination function controlled channel access (HCCA) or enhanced distributed channel access (EDCA)), a WiFi Alliance WiFi multimedia (WMM)-based resource, or some other existing or later-developed resource type.

The resource description 512 may be a textual description of the particular resource type, e.g., this resource type describes 802.11e video traffic streaming parameters.

Entities of the network 100 may have access to the information contained in the resource definition 500, e.g., through an implementable standard, and may adjust their behavioral processes accordingly.

Referring again to FIG. 4, the RDIE 400 may also have a resource descriptor count 420, which indicates the number of alternative resource descriptors that follow the RDIE 400, and a status code 424, which may be used in response messages to indicate a result of the request. The status code 424 may be set to zero when the RDIE 400 is included in a request and ignored when received.

Figure 6:
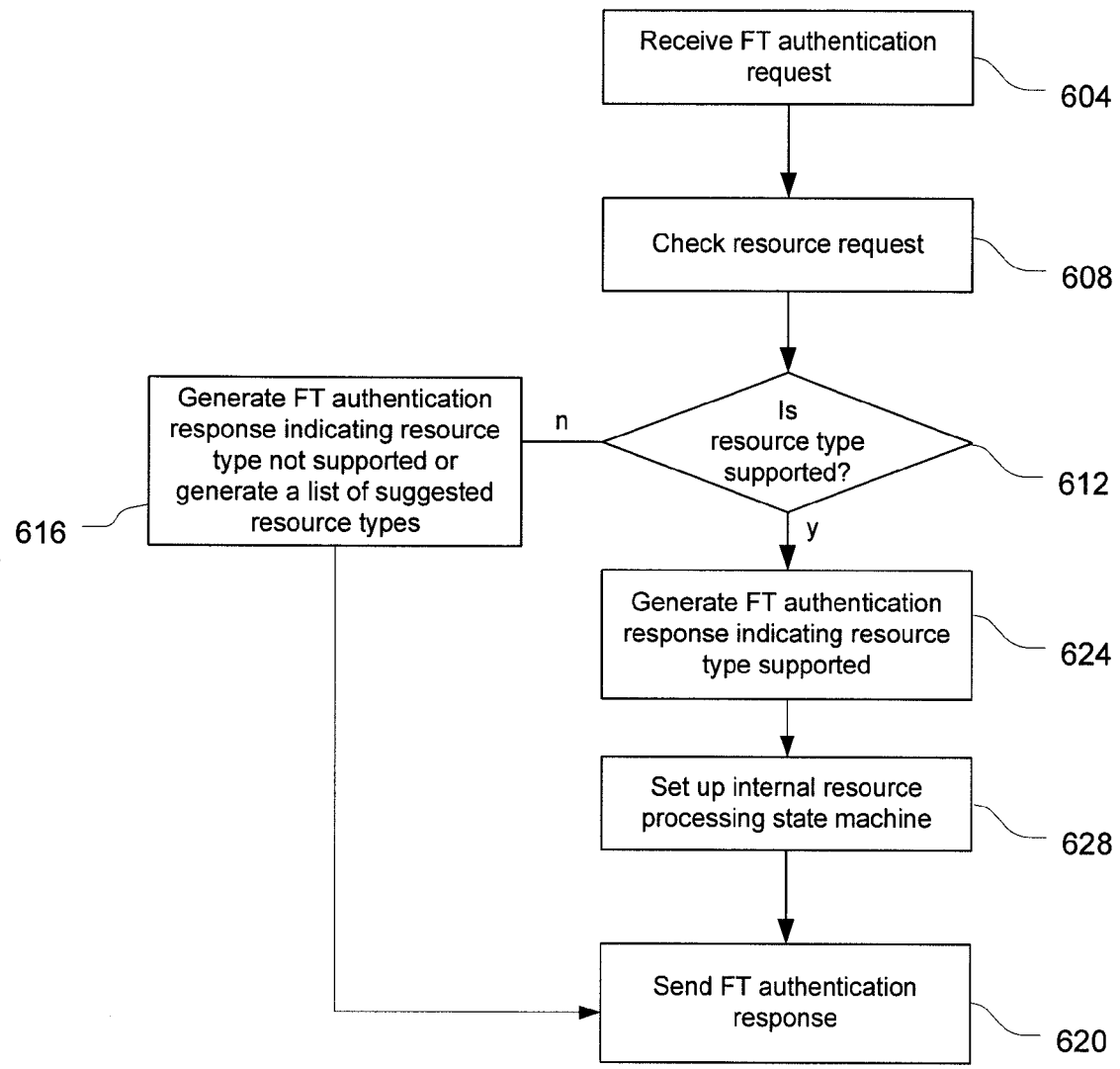
FIG. 6 illustrates a flowchart depicting a fast transitioning operation in accordance with various embodiments of this invention.

FIG. 6 illustrates operations of the AP 116 upon receipt of the FT authentication request 220 in accordance with various embodiments of the present invention. The AP 116 may receive the FT authentication request 220 at block 604 and check the resource request at block 608. If it is determined that the resource type associated with the resource identifier is not supported by the AP 116 at block 612, the AP 116 may generate an FT authentication response indicating that the resource type is not supported at block 616. In some embodiments, the AP 116 may include one or more resource types that are supported in the FT authentication response in case the station 104 is able to use an alternative resource type. The AP 116 may transmit the FT authentication response to the station 104 at block 620.

If it is determined that the resource type is supported at block 612, the AP 116 may generate an FT authentication response indicating that the resource type is supported at block 624. The AP 116 may then set up internal resource processing state machines at block 628 in anticipation of a subsequent resource request. The AP 116 may also do a backend resource verification with a QoS server at this time. The resources themselves may not be allocated at this point in order to prevent a denial of service (DoS) attack from occurring by a station issuing multiple non-authenticated resource requests to various APs of the network 100. However, the readying of the state machines may be sufficient to reduce the latency of the resource allocation when the subsequent authenticated resource request is received. The AP 116 may transmit the FT authentication response to the station 104 at block 620.

Referring again to FIG. 2, the AP 116 may transmit an FT authentication response 224 following the processing of the FT authentication request 220, which may be done in a manner similar to that described above with reference to FIG. 6.

Figure 7:
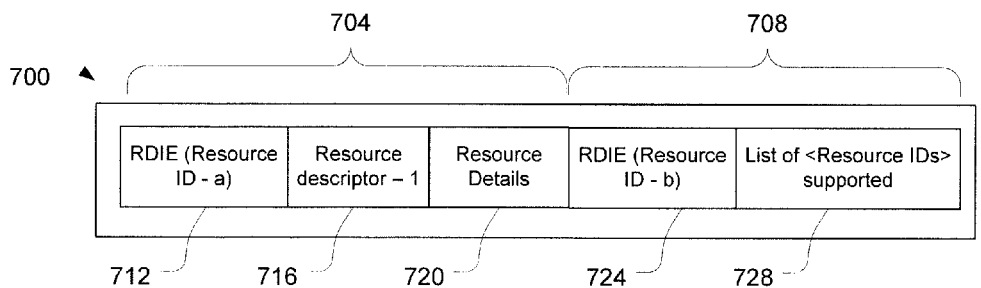
FIG. 7 illustrates a data structure of a resource negotiation response in accordance with various embodiments of this invention.

FIG. 7 illustrates a data structure of a resource negotiation response 700 that may be transmitted in the FT authentication response 224 in accordance with various embodiments of the present invention. The resource negotiation response 700 (hereinafter "resource response 700") may include a data stream resource response for each stream of the resource request, e.g., stream 704 to correspond to stream 304, and stream 708 to correspond to stream 308.

In this embodiment, the AP 116 may have the first QoS resource requested in stream 304. Accordingly, stream 704 may include an RDIE 712 followed by the resource descriptor—1 716. The stream 704 may also include any relevant resource details 720.

In this embodiment, the AP 116 may not have the QoS resource requested in stream 308. Accordingly, a status code of RDIE 724 may indicate that the resource type is not supported. In some embodiments, the stream 708 may include a current list of resource types that are available and/or supported (e.g., resource IDs) as suggested alternatives for the station 104.

The FT authentication request 220 and the FT authentication response 224 may take place over the distribution system (ODS), e.g., via the AP 112, or over the air (OTA). If these authentication messages are transmitted OTA, they may transmitted in management frames. If they are transmitted ODS, they may be transmitted in management frames or data frames. Transmitting authentication messages in data frames may allow for more backend flexibility, especially for backend AP vendor inter-operability.

Security information may also be transmitted in the FT authentication request 220 and the FT authentication response 224 to allow the station 104 and the AP 116 to mutually authenticate one another through derivation of appropriate session keys.

The security information may include identities of various key holders, e.g., R0KH-ID and R1KH-ID, to facilitate the derivation and distribution of the PMK-R1 keys. These KH-IDs may be communicated through fast transition information elements (FTIE) in the authentication messages.

Deriving the session keys may include the KH associated with the AP 116, e.g., KH 140, and the station 104 deriving a new PTK. To do so, the KH 140 may need the identity of the R0KH 132, which may be responsible for generating and delivering the PMK-R1 keys to the KHs of the MD 128, in order to request the PMK-R1 key. Upon receiving a PMK-R1 key from the R0KH 132, the KH 140, which may be referred to as R1 KH 140 in this instance, may derive a PTK.

The station 104 may receive the identity of the R1 KH 140 and derive a PTK session key that should match the PTK session key generated by the R1 KH 140.

In various embodiments, an identity of a wireless network node may be a network address such as, but not limited to, a media access control (MAC) address.

Once the session keys are derived, the station 104 may transmit a resource request in an integrity protected association message, e.g., reassociation request 228. Various aspects of the reassociation request may then be verified by the AP 116 upon receipt.

The AP 116 may verify that the resource request of the reassociation request 228 matches the resource request of the FT authentication request 220. In various embodiments, this may include a full or partial match. For example, the AP 116 may verify that certain components of the resource requests match each other, e.g., resource ID and QoS resources. This verification process may help to prevent downgrade attacks from occurring by the station 104 changing the resource request post-authentication.

The AP 116 may further verify that the reassociation request 228 passes integrity checks by analyzing a message integrity code-key confirmation key (MIC-KCK) field in the reassociation request 228.

The AP 116 may also ensure that the security ciphers have not been changed to exploit a potential vulnerability in the network 100. Consider, e.g., a scenario in which the station 104 initially associates with the AP 116 using a first cipher, e.g., wired equivalent privacy (WEP). If the station 104 moves to AP 120, which shares the same KH 140, then it will use the same PMK-R1 key and could change the first cipher to a second cipher, e.g., temporal key integrity protocol (TKIP). In order to avoid a station manipulating a detected vulnerability of a cipher to compromise communication sessions on other APs that use the same root key, the AP 116 may verify that the security ciphers included in the reassociation request 228 are the same as the ciphers used in the initial secure association 204. The identities of the security ciphers may be included in a robust security network IE (RSNIE).

In other embodiments, other mechanisms may be employed to ensure that the security ciphers remain the same as a station moves between different APs of a particular MD. For example, the identities of the security ciphers used in the initial association of a station with the network 100 may be incorporated into the PMK-R1 key derivation. Changing the security ciphers may prevent the proper session keys from being derived.

Once the AP 116 verifies the various aspects of the reassociation request 228 it may proceed to allocate available QoS resources. The allocated resources may be communicated to the station 104 through an integrity-protected reassociation response 232. In some occasions it may be that the AP 116 is unable to allocate any of the requested resources at this point. In that event, the non-allocation of the resources and/or suggested alternative resources may be communicated to the station 104 in the reassociation response 232.

Figure 8:
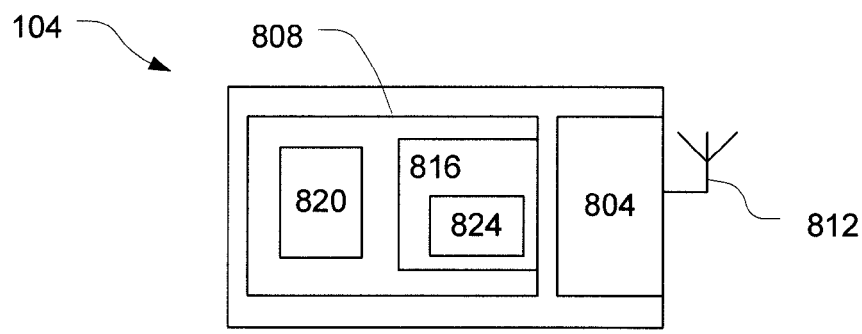
FIG. 8 illustrates components of a station in accordance with various embodiments of this invention.

FIG. 8 illustrates components of the station 104 in accordance with various embodiments of this invention. The station 104 may include a wireless network interface card (WNIC) 804 to facilitate wireless communication with other devices of the network 100. The WNIC 804 may facilitate processing of messages to and/or from components of a host 808. The WNIC 804 may cooperate with an antenna structure 812 to provide access to other devices of the network 100.

In various embodiments, the antenna structure 812 may include one or more directional antennas, which radiate or receive primarily in one direction (e.g., for 120 degrees), cooperatively coupled to one another to provide substantially omnidirectional coverage; or one or more omnidirectional antennas, which radiate or receive equally well in all directions.

In various embodiments, the host 808 may include a driver, e.g., wireless local area network (WLAN) driver 816, to drive the WNIC 804 for other components of the host 808 such as a transitioning manager 820. The transitioning manager 820 may control FT operations of the station 104 such as those discussed in embodiments of this invention.

In an embodiment the driver 816 may include a supplicant 824 to act as a security software component, e.g., for performing MIC calculations.

Figure 9:
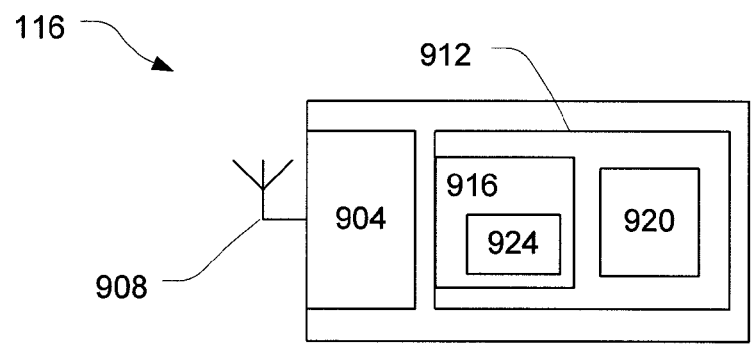
FIG. 9 illustrates components of an access point in accordance with various embodiments of this invention.

FIG. 9 illustrates components of the AP 116 in accordance with various embodiments of this invention. The AP 116 may include a WNIC 904 and antenna structure 908 to facilitate wireless communication with wireless devices of the network 100, similar to like-name components of the station 104. The AP 116 may include a host 912 having a driver 916 to drive the WNIC 904 for other components of the host 912 such as an association manager 920. The association manager 920 may control FT operations of the AP 116 such as those discussed in embodiments of this invention.

In an embodiment the driver 916 may include a supplicant 924 to act as a security software component, e.g., for performing MIC calculations.

Figure 10:
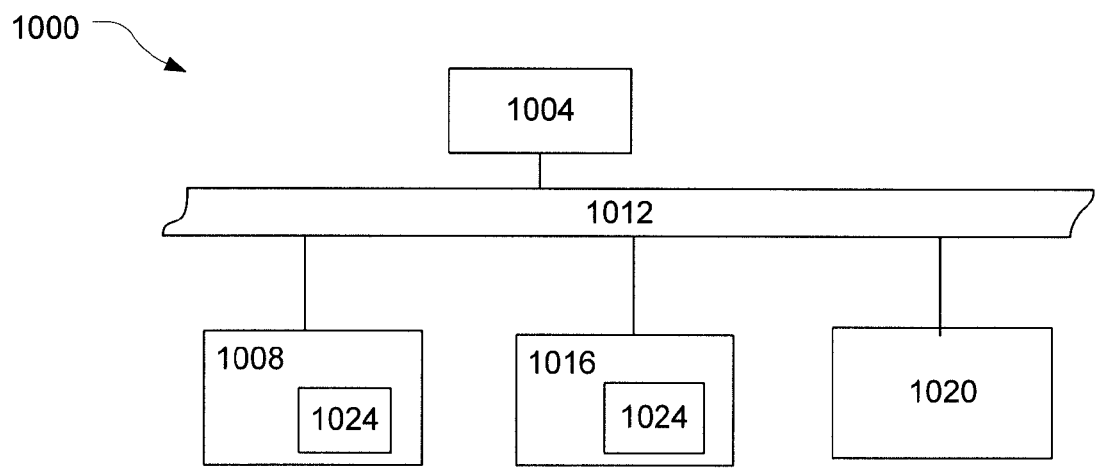
FIG. 10 illustrates a computing device in accordance with various embodiments of this invention.

FIG. 10 illustrates a computing device 1000 capable of implementing a wireless network device in accordance with various embodiments. As illustrated, for the embodiments, computing device 1000 includes processor 1004, memory 1008, and bus 1012, coupled to each other as shown. Additionally, computing device 1000 includes storage 1016, and communication interfaces 1020, e.g., a WNIC, coupled to each other, and the earlier described elements as shown.

Memory 1008 and storage 1016 may include in particular, temporal and persistent copies of FT logic 1024, respectively. The FT logic 1024 may include instructions that when accessed by the processor 1004 result in the computing device 1000 performing FT operations described in conjunction with various wireless network devices in accordance with embodiments of this invention.

In various embodiments, the memory 1008 may include RAM, dynamic RAM (DRAM), static RAM (SRAM), synchronous DRAM (SDRAM), dual-data rate RAM (DDRRAM), etc.

In various embodiments, the processor 1004 may include one or more single-core processors, multiple-core processors, controllers, application-specific integrated circuits (ASICs), etc.

In various embodiments, storage 1016 may include integrated and/or peripheral storage devices, such as, but not limited to, disks and associated drives (e.g., magnetic, optical), universal serial bus (USB) storage devices and associated ports, flash memory, read-only memory (ROM), non-volatile semiconductor devices, etc. In various embodiments, storage 1016 may be a storage resource physically part of the computing device 1000 or it may be accessible by, but not necessarily a part of, the computing device 1000. For example, the storage 1016 may be accessed by the computing device 1000 over a network.

In various embodiments, computing device 1000 may have more or less components, and/or different architectures. In various embodiments, computing device 1000 may be a station, an access point, or some other wireless network node. Although the present invention has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This description is intended to be regarded as illustrative instead of restrictive on embodiments of the present invention.

What is claimed is:

1. A fast transitioning method:
establishing, by a station, a wireless connection with a network node;
transmitting, by the station to another network node, a fast transitioning (FT) authentication request including a resource identifier identifying a desired type of resource, wherein the desired type resource comprises a wireless multimedia extension resource type;
receiving, by the station, from the another network node, an FT authentication response indicating whether the desired type of resource is supported by the another network node; and
selecting, by the station, the another network node as a reassociation target for reassociating the wireless connection based at least in part on the FT authentication response.

2. The method of claim 1, further comprising:
transmitting the FT authentication request to the another network node via the network node in a data frame.

3. The method of claim 1, further comprising:
transmitting, to the another network node, a reassociation request including the resource identifier after transmitting the FT authentication request.

4. The method of claim 3, wherein a security cipher is used in the wireless connection with the network node and said transmitting the reassociation request includes transmitting an identity of the security cipher.

5. The method of claim 3, wherein the reassociation request is an integrity-protected message.

6. The method of claim 1, further comprising:
transmitting, to the another network node, a resource information container data information element (RDIE) including the resource identifier.

7. A wireless communication system:
an antenna configured to provide access to a wireless network; and
a host including a transitioning manager configured
to transmit, via the antenna, a fast transitioning (FT) authentication request to a network node, the FT authentication request including a resource identifier identifying a desired type of resource;
to receive, via the antenna, an FT authentication response from the network node, the FT authentication response indicating whether the desired type of resource is supported by the network node;
to select the network node as a reassociation target for reassociating a wireless connection based at least in part on the FT authentication response; and
to transmit, to the network node, a re-association request including the resource identifier after transmission of the FT authentication request.

8. The system of claim 7, wherein the wireless connection is initially associated with another network node and the transitioning manager is configured to transmit the FT authentication request to the network node via the another network node in a data frame.

9. The system of claim 7, wherein the transitioning manager is configured to transmit the reassociation request as an integrity-protected message.

10. A wireless apparatus comprising:
a wireless network interface coupled to a host and configured to provide the host access to a wireless network; and
the host including an association manager configured
to receive, from a network node via the wireless network interface, a fast transitioning (FT) authentication request including a first resource negotiation request having a resource identifier, identifying a type of resource desired by the network node, and one or more requested quality of service (QoS) resources;
to generate an FT authentication response indicating that the desired type of resource is supported by the apparatus;
to transmit, to the network node via the wireless network interface, the FT authentication response;

to receive a reassociation request, from the network node via the wireless network interface, including a second resource negotiation request; and to allocate at least a selected one of the one or more requested QoS resources based at least in part on whether the first resource negotiation request matches the second resource negotiation request.

11. The apparatus of claim 10, wherein the association manager is further configured to prepare one or more resource processing state machines for allocation of the type of resource desired prior to receiving the reassociation request.

12. The apparatus of claim 10, wherein the the association manager is further configured to receive the reassociation request, from the network node via the wireless network interface, including an identity of a security cipher and requesting to reassociate an existing wireless connection with another network node to the apparatus; and to allocate at least a selected one of the one or more requested QoS resources based at least further in part on whether the identity of the security cipher corresponds to a security cipher used in the existing wireless connection between the network node and another network node.

13. A wireless apparatus comprising:

a wireless network interface coupled to a host and configured to provide the host access to a wireless network; and the host including an association manager configured to receive, from a network node via the wireless network interface, a fast transitioning (FT) authentication request including a first resource negotiation request having a resource identifier, identifying a type of resource desired by the network node, and one or more requested quality of service (QoS) resources;

to generate an FT authentication response indicating that the desired type of resource is supported by the apparatus;

to transmit, to the network node via the wireless network interface, the FT authentication response;

to receive a reassociation request, from the network node via the wireless network interface, as an integrity protected message; and to allocate at least a selected one of the one or more requested QoS resources based at least in part on an integrity check of the reassociation request.

14. The apparatus of claim 10, wherein the FT authentication request includes an identity of a security cipher used in an existing wireless connection between the apparatus and another network node and the association manager is further configured to derive a session key based at least in part on the identity.

15. A non-transitory machine-accessible medium having associated instructions, which, when executed by a processor, results in a wireless apparatus receiving, wirelessly from a network node, a fast transitioning (FT) authentication request including a resource identifier, identifying a type of resource desired by the network node, and one or more requested quality of service (QoS) resources;

generating an FT authentication response indicating that the desired type of resource is supported by the apparatus;

transmitting, wirelessly to the network node, the FT authentication response;

receiving, wirelessly from the network node, a reassociation request including an identity of a security cipher and requesting to reassociate an existing wireless connection with another network node to the apparatus; and allocating at least a selected one of the one or more requested QoS resources based at least in part on whether the identity of the security cipher corresponds to a security cipher used in the existing wireless connection between the network node and the another network node.

16. The non-transitory machine-accessible medium of claim 15 having associated instructions, which, when executed, further results in the apparatus preparing one or more state machines for a subsequent request, from the network node, for allocation of the type of resource desired.

17. The non-transitory machine-accessible medium of claim 15, wherein:

the FT authentication request includes a first resource negotiation request having the resource identifier and the one or more requested QoS resources;

the reassociation request includes a second resource negotiation request; and the associated instructions, when executed, further results in the apparatus allocating at least the selected one of the one or more requested QoS resources based at least in part on whether the first resource negotiation request matches the second resource negotiation request.

* * * * *